United States Patent
Lin et al.

(10) Patent No.: US 9,554,351 B2
(45) Date of Patent: Jan. 24, 2017

(54) METHOD FOR HANDLING RADIO ACTIVITIES OF MULTIPLE SIM CARDS EQUIPPED IN A COMMUNICATIONS APPARATUS AND COMMUNICATIONS APPARATUS UTILIZING THE SAME

(71) Applicant: MediaTek Inc., Hsin-Chu (TW)

(72) Inventors: Mu-Tai Lin, Zhudong Township, Hsinchu County (TW); Wan-Ting Huang, Tainan (TW)

(73) Assignee: MEDIATEK INC., Hsin-Chu (TW)

( * ) Notice: Subject to any disclaimer, the term of this patent is extended or adjusted under 35 U.S.C. 154(b) by 33 days.

(21) Appl. No.: 14/567,120

(22) Filed: Dec. 11, 2014

(65) Prior Publication Data

US 2016/0174182 A1  Jun. 16, 2016

(51) Int. Cl.
*H04W 60/02* (2009.01)
*H04W 8/20* (2009.01)
*H04W 48/16* (2009.01)
*H04W 88/06* (2009.01)
*H04W 8/18* (2009.01)

(52) U.S. Cl.
CPC .............. *H04W 60/02* (2013.01); *H04W 8/205* (2013.01); *H04W 48/16* (2013.01); *H04W 8/183* (2013.01); *H04W 88/06* (2013.01)

(58) Field of Classification Search
CPC ...... H04W 60/02; H04W 48/16; H04W 8/205; H04W 88/06; H04W 8/183
See application file for complete search history.

(56) References Cited

U.S. PATENT DOCUMENTS

| 2007/0123254 A1* | 5/2007 | Choi | ..................... H04W 24/00 455/434 |
| 2015/0004973 A1* | 1/2015 | Gude | .................. H04W 76/025 455/435.2 |

* cited by examiner

*Primary Examiner* — George Eng
*Assistant Examiner* — Joseph Dean, Jr.
(74) *Attorney, Agent, or Firm* — McClure, Qualey & Rodack, LLP

(57) ABSTRACT

A communications apparatus includes multiple SIM cards, a RF signal processing module including two or more RF signal processing units which including at least a first RF signal processing unit, and an arbiter configured for dynamically determining which SIM card to use which RF signal processing unit for handling a radio activity of the SIM card according to priority of radio activities of the SIM cards and RF signal processing capability of the RF signal processing units. A number of the SIM cards is equal to or greater than a number of the RF signal processing units included in the RF signal processing module.

15 Claims, 8 Drawing Sheets

METHOD FOR HANDLING RADIO ACTIVITIES OF MULTIPLE SIM CARDS EQUIPPED IN A COMMUNICATIONS APPARATUS AND COMMUNICATIONS APPARATUS UTILIZING THE SAME

BACKGROUND OF THE INVENTION

Field of the Invention

The invention relates to methods for handling multiple radio activities of multiple SIM cards equipped in a communications apparatus.

Description of the Related Art

The term "wireless" normally refers to an electrical or electronic operation that is accomplished without the use of a hard-wired connection. "Wireless communication" is the transfer of information over a distance without the use of electrical conductors or wires. The distances involved may be short (a few meters for television remote controls) or very long (thousands or even millions of kilometers for radio communications). The best-known example of wireless communications is the cellular telephone. Cellular telephones use radio waves to enable an operator to make phone calls to another party from many locations world-wide. They can be used anywhere, as long as there is a cellular telephone site to house equipment that can transmit and receive signals, which are processed to transfer both voice and data to and from the cellular telephones.

There are various well-developed and -defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the 2G GSM system. The Wireless Fidelity (Wi-Fi) is a technology defined by the 802.11b engineering standard and can be used in home networks, mobile phones, and video games to provide a high-frequency wireless local area network.

With the advanced development of wireless communications technologies, it is now possible to provide multiple wireless communications services using different or the same communications technologies in one communications apparatus. In order to provide more efficient and reliable wireless communications services, methods for handling multiple radio activities of multiple SIM cards equipped in a communications apparatus are provided.

BRIEF SUMMARY OF THE INVENTION

Communications apparatus and method for handling multiple radio activities of multiple SIM cards equipped in a communications apparatus are provided. An exemplary embodiment of a communications apparatus comprises a plurality of SIM cards, a RF signal processing module comprising two or more RF signal processing units, and an arbiter configured for dynamically determining which SIM card to use which RF signal processing unit for handling a radio activity of the SIM card according to priority of a plurality of radio activities of the SIM cards and RF signal processing capability of the RF signal processing units. A number of the SIM cards is equal to or greater than a number of the RF signal processing units comprised in the RF signal processing module.

An exemplary embodiment of a method for handling a plurality of radio activities of a plurality of SIM cards equipped in a communications apparatus comprising a RF signal processing module comprising two or more RF signal processing units and a number of the SIM cards is equal to or greater than a number of the RF signal processing units comprised in the RF signal processing module comprises: determining RF signal processing capability of the RF signal processing units; determining priority of the radio activities of the SIM cards; dynamically determining which SIM card to use the which RF signal processing unit for handling the radio activity thereof according to the priority of the radio activities of the SIM cards and the RF signal processing capability of the RF signal processing units.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
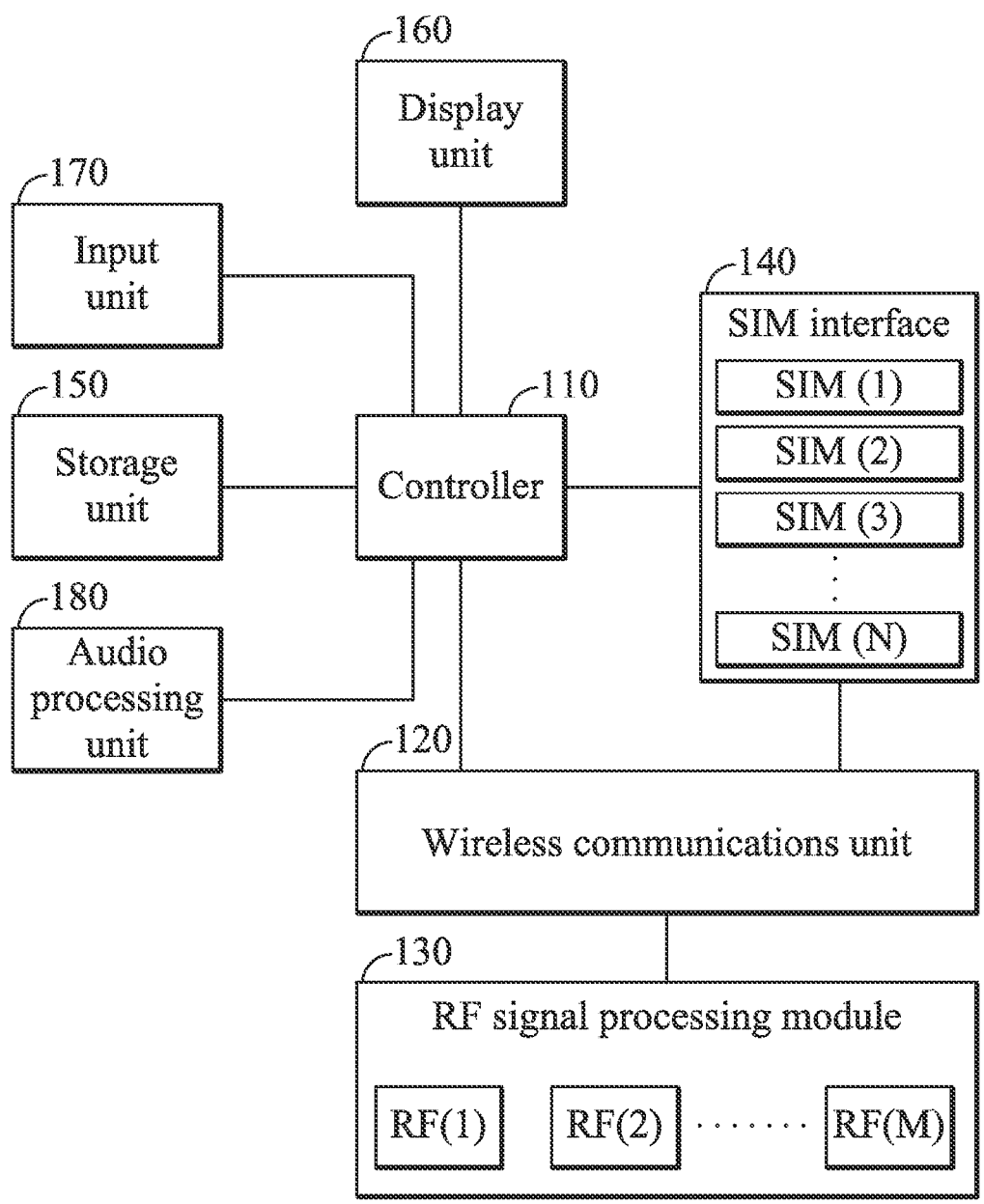
FIG. 1 is a block diagram of a communications apparatus according to an embodiment of the invention.

FIG. 1 is a block diagram of a communications apparatus according to an embodiment of the invention. The communications apparatus 100 may be a notebook, a cellular phone, a portable gaming device, a portable multimedia player, a Global Positioning System (GPS), a receiver, a personal digital assistant, a tablet computer, or another such device. According to an embodiment of the invention, the communications apparatus 100 may comprise a controller 110, a wireless communications unit 120, a Radio Frequency (RF) signal processing module 130, a Subscriber Identity Module (SIM) interface 140, a storage unit 150, a display unit 160, an input unit 170 and an audio processing unit 180. Note that, in order to clarify the concept of the invention, FIG. 1 presents a simplified block diagram of a communications apparatus. However, the invention should not be limited to what is shown in FIG. 1.

The RF signal processing module 130 may comprise two or more RF signal processing units RF(1), RF(2), ... RF(M), where M is a positive integer and $M \geq 1$. The RF signal processing units may comprise one or more antennas and one or more hardware elements to perform radio frequency conversion. For example, a RF signal processing unit may comprise an antenna, a power amplifier, a mixer, a filter, and so on. Each RF signal processing unit is configured for receiving the RF signals and processing the received RF signals to convert the received RF signals to baseband signals, or receiving baseband signals and converting the received baseband signals to RF signals to be transmitted to a peer communications apparatus. The peer communications apparatus may be, for example but is not limited to, a base station, an eNode B, an access point, or other such devices in the wireless network.

The wireless communications unit 120 is configured for processing the baseband signals corresponding to the RF signals received from the RF signal processing units to obtain information or data transmitted by the peer communications apparatus, such as the system information carried by the peer communications apparatus in the RF signals, and is configured for processing uplink data to be transmitted to the peer communications apparatus as the baseband signals and provide the baseband signals to the corresponding RF signal processing units.

The wireless communications unit 120 may comprise a plurality of hardware elements and a plurality of firmware and software modules to perform baseband signal processing. The baseband signal processing may comprise analog-to-digital conversion (ADC)/digital-to-analog conversion (DAC), gain adjustment, modulation/demodulation, encoding/decoding, and so on. The firmware and software modules accompanying the hardware elements comprised in the wireless communications unit 120 may be regarded as a modem (not shown) for assisting the SIM cards comprised in the SIM interface 140 in communicating with a corresponding peer communications apparatus in the wireless network.

Note that in the embodiments of the invention, depending on different system requirements and the communications capability of the communications apparatus 100, the wireless communications unit 120 may also be designed to comprise more than one modem, and each may correspond to one or more SIM cards for processing the baseband signals and processing or handling the communications procedures thereof, so as to assist the corresponding SIM card(s) in communicating with a corresponding peer communications apparatus in the wireless network. Therefore, the invention should not be limited to any specific implementation method.

The controller 110 may control the operations of the wireless communications unit 120, the RF signal processing module 130, the SIM interface 140, the storage unit 150, the display unit 160, the input unit 170 and the audio processing unit 180. According to an embodiment of the invention, the controller 110 may also be arranged to execute the program codes of the firmware and software modules of the wireless communications unit 120, the RF signal processing module 130, the SIM interface 140, the storage unit 150, the display unit 160, the input unit 170 and the audio processing unit 180. The program codes accompanied with specific data in a data structure may also be referred to as a logic unit or a stack instance when being executed. Therefore, the controller may be regarded as comprising a plurality of logic units, each for executing one or more specific functions or tasks of the corresponding firmware and software modules.

The SIM interface 140 may comprise a plurality of SIM cards SIM(1), SIM(2), ... SIM(N), where N is a positive integer and $N \geq 2$. Note that in the embodiments of the invention, $N \geq M$. The storage unit 150 may be configured for storing system data and program codes. The display unit 160 may be provided as an interface to the user and configured for display data, image and video scenes. The input unit 170 may be provided as another interface to the user and configured for receiving the information or commands input by the user. The audio processing unit 180 may be coupled to a speaker (not shown) and a microphone (not shown) and configured for processing audio signals received from the microphone or transmitted to the speaker.

According to an embodiment of the invention, an arbiter may be introduced for dynamically assigning a suitable RF signal processing unit RF(m) to a specific SIM cards SIM(n) for handling the radio activity and processing the RF signals thereof, where n and m are positive integers, $n \leq N$ and $m \leq M$. In the embodiments of the invention, the arbiter may be a logic unit of the controller 110 and configured for arbitrating the right to use the RF signal processing units shared by the SIM cards. Note that in other embodiments, the arbiter may also be designed and implemented as a dedicated hardware device, and the invention should not be limited thereto. In addition, no matter whether the arbiter is implemented by a dedicated hardware device or by the firmware and/or software module executed by the controller 110, the term "arbiter" is used as a subject term in the following paragraphs to clearly describe the operations thereof.

According to an embodiment of the invention, the arbiter may dynamically determine which SIM card to use which RF signal processing unit for handling a radio activity of that SIM card according to RF signal processing capability of the RF signal processing units and priority of radio activities of the SIM cards.

Figure 2:
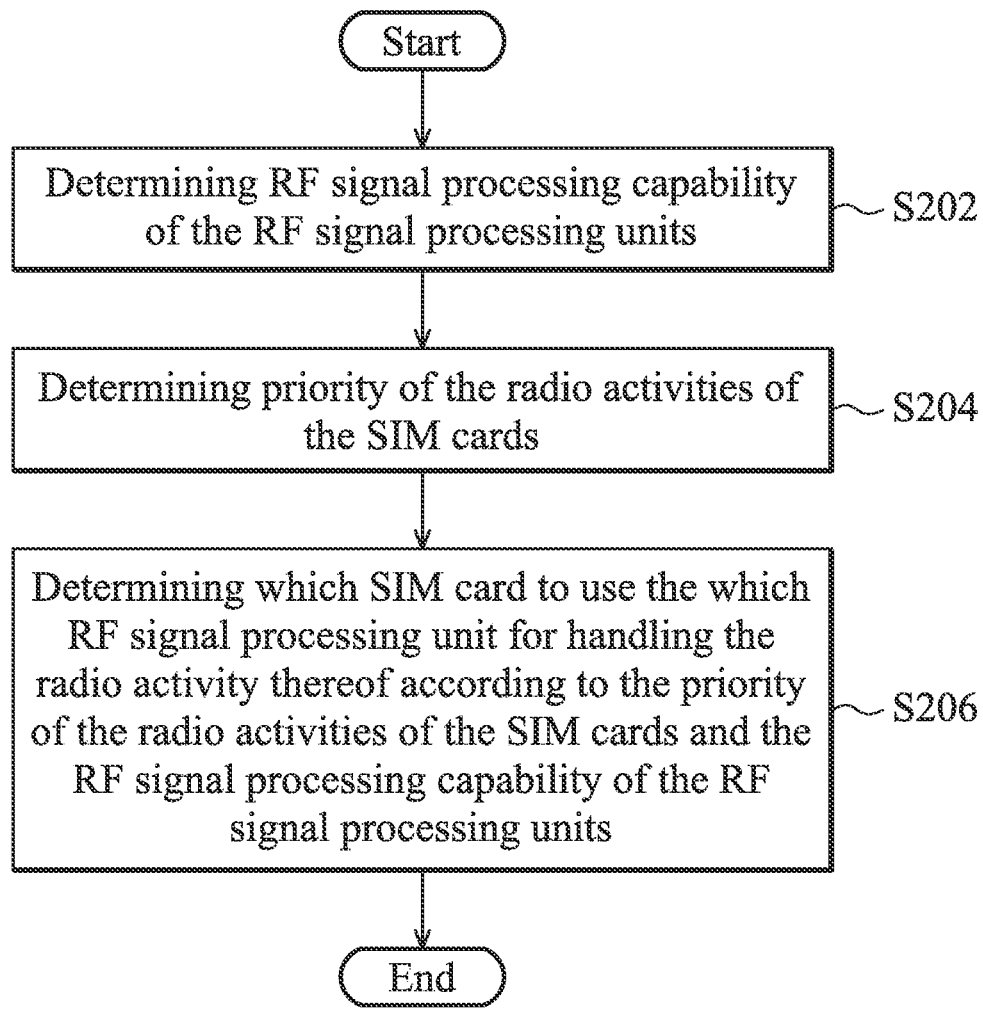
FIG. 2 shows a flow chart of a method for handling a plurality of radio activities of a plurality of SIM cards equipped in a communications apparatus according to an embodiment of the invention.

FIG. 2 shows a flow chart of a method for handling a plurality of radio activities of a plurality of SIM cards equipped in a communications apparatus according to an embodiment of the invention. First of all, the RF signal processing capability of the RF signal processing units comprised in the RF signal processing module is determined (Step S202). Next, priority of the radio activities of the SIM cards is determined (Step S204). Finally, which SIM card to use the which RF signal processing unit for handling the radio activity thereof is determined according to the priority of the radio activities of the SIM cards and the RF signal processing capability of the RF signal processing units (Step S206). Note that since the radio activity to be performed by each SIM card may occur anytime, steps S204 and S206 may be performed by the arbiter anytime when a radio activity is scheduled and about to be performed.

According to an embodiment of the invention, the RF signal processing capability of a RF signal processing unit may be determined according to a number of Radio Access Technologies (RATs) supported by the RF signal processing unit, a number of frequency bands supported by the RF signal processing unit, and a bandwidth supported by the RF signal processing unit. In the embodiments of the invention, the RF signal processing units comprised in the RF signal processing module may support one or more RATs. Generally, one RF signal processing unit is regarded as having higher RF signal processing capability than another when the RF signal processing unit supports more RATs than another, supports more frequency bands than another, and/or supports wider bandwidth than another. Here, the term "support" means the RF signal processing unit is capable of processing RF signals of the RAT, in the frequency band and/or within the bandwidth.

According to an embodiment of the invention, at least one of the RF signal processing units is assigned to and dedicatedly used by one SIM card for handling the radio activity thereof. In this manner, performance of the radio activity of the SIM card will not be interrupted for supporting another SIM card's radio activity within the duration of performing the radio activity.

In addition, according to an embodiment of the invention, when a number of the SIM cards is greater than a number of the RF signal processing units comprised in the RF signal processing module 130, at least one RF signal processing unit is assigned to and shared by more than one SIM card for handling the radio activities thereof. According to an embodiment of the invention, the shared RF signal processing unit may handle the radio activities of multiple SIM cards by turns.

Figure 3:
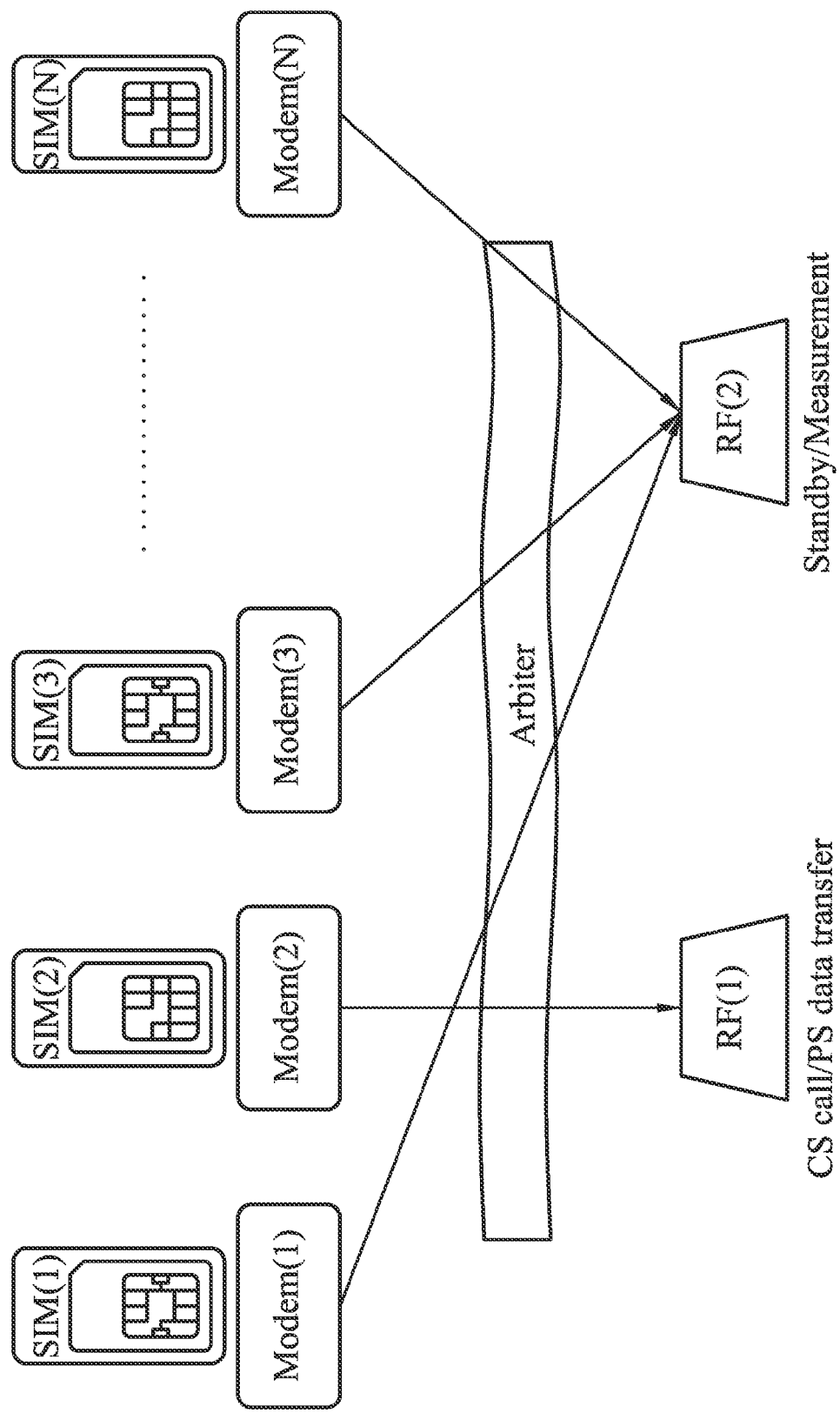
FIG. 3 is a schematic diagram showing an exemplary scenario according to an embodiment of the invention.

FIG. 3 is a schematic diagram showing an exemplary scenario according to an embodiment of the invention. As shown in FIG. 3, the RF signal processing unit RF(1) is assigned to be dedicatedly used by the SIM card SIM(2) and the corresponding modem modem (2) for handling the Circuit Switch (CS) call or Packet Switch (PS) data transfer radio activity. At the same time, the RF signal processing unit RF(2) is assigned to be shared by the SIM card SIM(1) and the corresponding modem modem (1), the SIM card SIM(3) and the corresponding modem modem (3), . . . and the SIM card SIM(N) and the corresponding modem modem (N) for handling the standby or measurement radio activities thereof. To be more specific, the SIM cards SIM(1), SIM(3), . . . SIM(N) and the correspond modems modem (1), modem (3), . . . modem(N) may listen to the paging indicator and/or perform cell/frequency measurement in the corresponding wireless network that the corresponding SIM card associates with via the RF signal processing unit RF(2) in a round robin manner. In this manner, CS call or PS data transfer of the SIM card SIM(2) operating in the dedicated mode will not be interrupted, while the remaining SIM cards SIM(1), SIM(3) . . . SIM(N) are still capable of operating in the idle mode for listening to the paging indicator or performing measurement.

Here, the term "associate with" means that the SIM card camps on a peer communications apparatus in the corresponding wireless network and keeps communicating with the peer communications apparatus in the corresponding wireless network by receiving system information therefrom, listening to paging indicator, performing measurement and reporting measurement result thereto, establishing dedicated CS or PS connection with the cell, or others.

Figure 4:
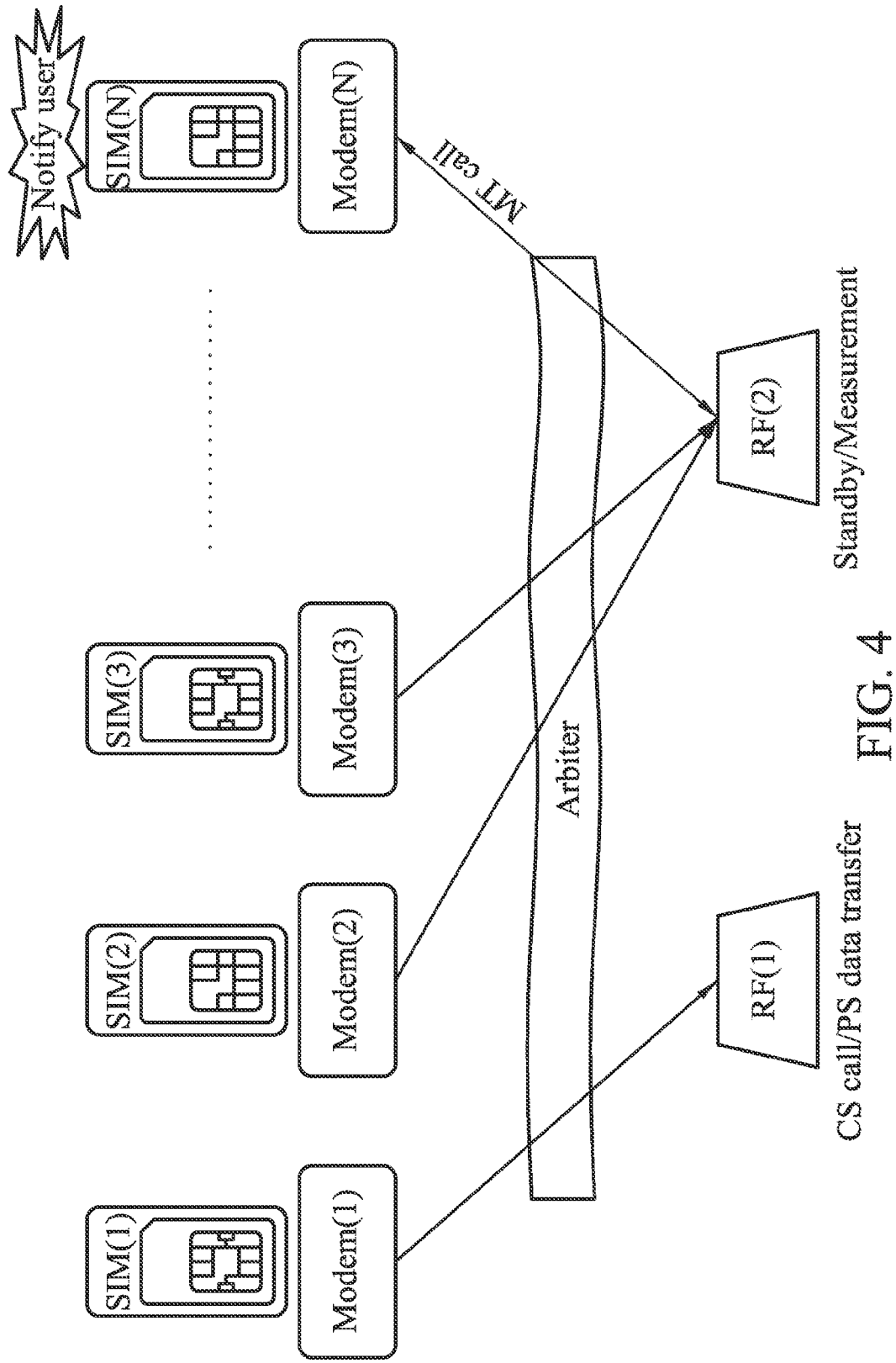
FIG. 4 is a schematic diagram showing another exemplary scenario according to another embodiment of the invention.

FIG. 4 is a schematic diagram showing another exemplary scenario according to another embodiment of the invention. As shown in FIG. 4, the RF signal processing unit RF(1) is assigned to be dedicatedly used by the SIM card SIM(1) and the corresponding modem modem (1) for handling the CS call or PS data transfer radio activity. At the same time, the RF signal processing unit RF(2) is assigned to be shared by the SIM card SIM(2) and the corresponding modem modem (2), the SIM card SIM(3) and the corresponding modem modem (3), . . . and the SIM card SIM(N) and the corresponding modem modem (N) for handling the standby or measurement radio activities thereof. In this manner, CS call or PS data transfer of the SIM card SIM(1) will not be interrupted, while the remaining SIM cards SIM(2), SIM(3) . . . SIM(N) are still capable of operating in the idle mode for listening to the paging indicator or performing measurement. Once a paging indicator indicating an incoming mobile terminated (MT) call is received by one of the standby SIM card, such as the SIM card SIM(N) as shown in FIG. 4, via the shared RF signal processing unit RF(2), the SIM card SIM(N) and the corresponding modem modem (N) may further notify the user of the incoming MT call. Therefore, the MT call will not be missed during the CS call or PS data transfer of the SIM card SIM(1).

Note that although in the exemplary scenario as shown in FIG. 3-FIG. 4, the shared RF signal processing unit is utilized for handling the standby or measurement radio activity, the invention should not be limited thereto. In the embodiments of the invention, the shared RF signal processing unit may be utilized for handling any radio activity, such as location update, routing area update, collecting system information, performing cell selection/reselection, or others not shown in FIG. 3-FIG. 4, as long as the RF signal processing unit can support such radio activity. Therefore, the invention should not be limited to the radio activities shown in FIG. 3-FIG. 4.

According to another embodiment of the invention, when a first RF signal processing unit is dedicatedly used by a first SIM card for handling a specific radio activity thereof, some other radio activities of the first SIM card may be handed to a second SIM card, such that the other radio activities of the first SIM card may be performed by the second SIM card via a second RF signal processing unit, as long as the second RF signal processing unit is capable of supporting the RAT of the first SIM card.

Figure 5:
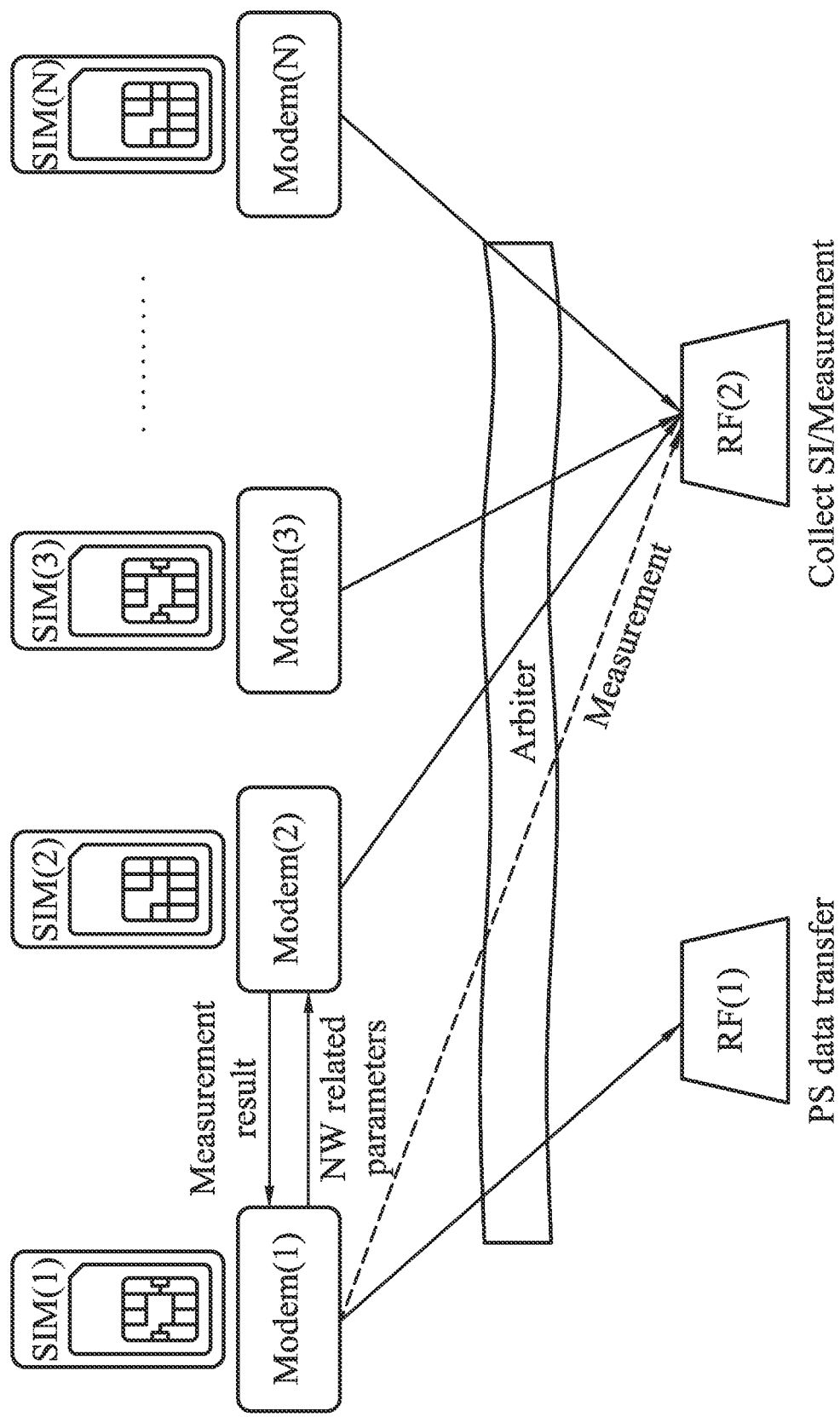
FIG. 5 is a schematic diagram showing yet another exemplary scenario according to yet another embodiment of the invention.

FIG. 5 is a schematic diagram showing yet another exemplary scenario according to yet another embodiment of the invention. As shown in FIG. 5, the RF signal processing unit RF(1) is assigned to be dedicatedly used by the SIM card SIM(1) and the corresponding modem modem (1) for handling the PS data transfer radio activity. The RF signal processing unit RF(2) is assigned to be shared by the SIM card SIM(2) and the corresponding modem modem (2), the SIM card SIM(3) and the corresponding modem modem (3), . . . and the SIM card SIM(N) and the corresponding modem modem (N) for handling the standby or measurement radio activities thereof.

In this embodiment, the SIM card SIM(1) and/or the corresponding modem modem (1) may further provide information regarding a plurality of network-related parameters, such as the downlink frequency, the Absolute Radio Frequency Carrier Number (ARFCN), UTRA Absolute Radio Frequency Channel Number (UARFCN), EUTRA Absolute Radio Frequency Channel Number (EARFCN), or others, of a first wireless network that the SIM card SIM(1) associates with to the SIM card SIM(2) and/or the corresponding modem modem (2).

The SIM card SIM(2) and the corresponding modem modem (2) may perform the radio activity for collecting system information from the first wireless network and/or performing measurements in the first wireless network according to the network-related parameters received from the SIM card SIM(1), so as to obtain the system information and/or a measurement result via the RF signal processing unit RF(2) when the RF signal processing unit RF(1) is dedicated for use by the SIM card SIM(1) for handling the PS data transfer radio activity of the SIM card SIM(1).

Note that the SIM card SIM(1) and the corresponding modem modem (1) is unable to perform the radio activity for collecting system information from the first wireless network and/or performing measurements in the first wireless network while the SIM card SIM(1) and the corresponding modem modem (1) is performing CS call or PS data transfer radio activity. The advantage of performing the radio activity of the SIM card SIM(1) by another SIM card instead is that the system information and/or measurement result may be obtained even when the SIM card SIM(1) is unable to perform the corresponding radio activity. In cases where a RAT change or cell reselection procedure is required, the SIM card SIM(1) may change to a preferred RAT or cell as soon as possible, and the success rate of RAT change or cell reselection can be increased as well.

Figure 6:
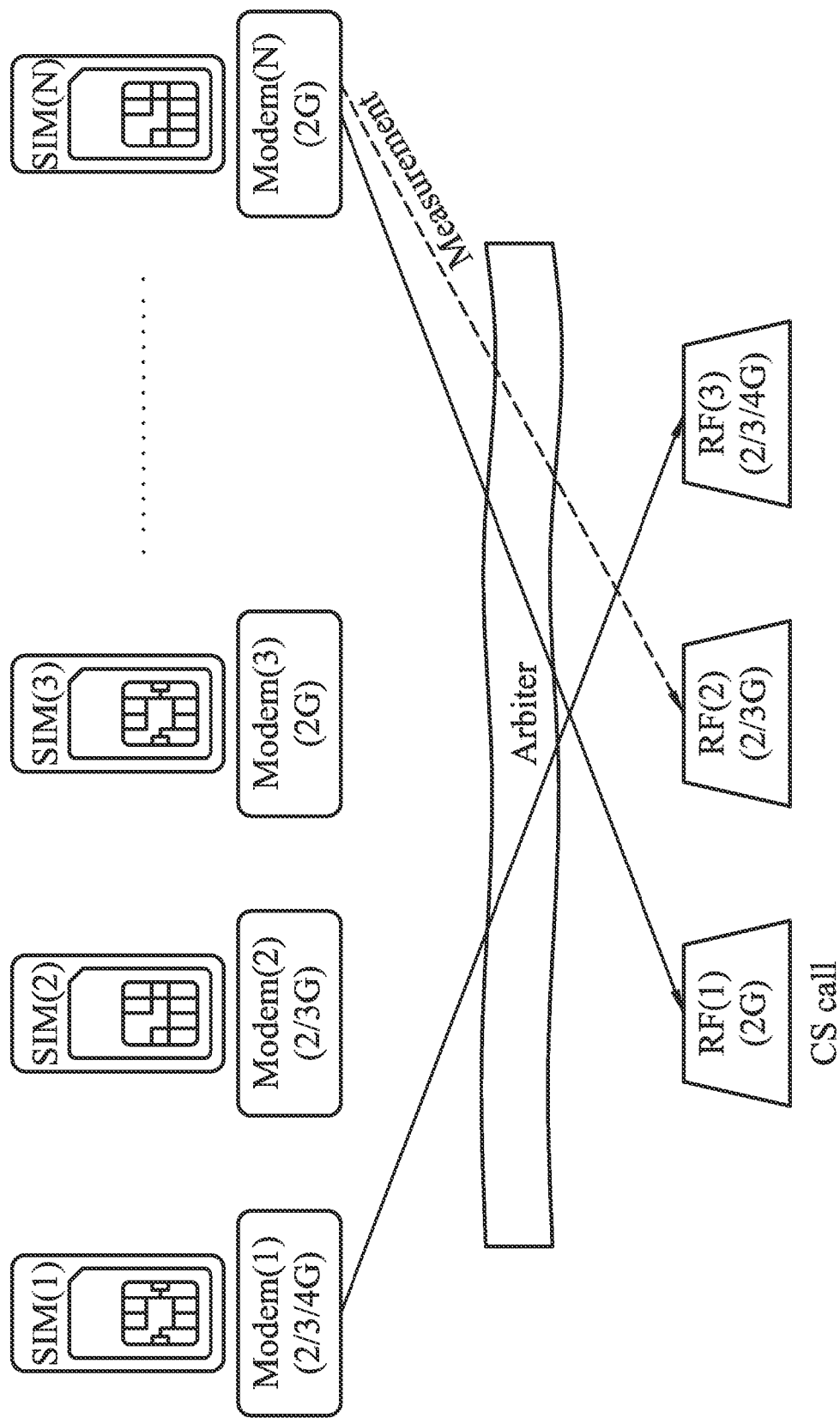
FIG. 6 is a schematic diagram showing still another exemplary scenario according to still another embodiment of the invention.

FIG. 6 is a schematic diagram showing still another exemplary scenario according to still another embodiment of the invention. In the embodiment, the SIM card SIM(1) and the corresponding modem modem (1) are capable of supporting 2G, 3G and 4G communications, the SIM card SIM(2) and the corresponding modem modem (2) are capable of supporting 2G and 3G communications, the SIM card SIM(3) and the corresponding modem modem (3) are capable of supporting 2G communications, and the SIM card SIM(N) and the corresponding modem modem (N) are capable of supporting 2G communications.

As shown in FIG. 6, the RF signal processing unit RF(1) is assigned to be dedicatedly used by the SIM card SIM(N) and the corresponding modem modem (N) for handling CS call radio activity. The RF signal processing unit RF(3) is assigned to be used by the SIM card SIM(1) for handling the standby or measurement radio activities thereof. Since the SIM card SIM(N) and the corresponding modem modem (N) is unable to perform the radio activity for collecting system information from the corresponding wireless network and/or performing measurements in the corresponding wireless network while performing CS call radio activity via the RF signal processing unit RF(1), the SIM card SIM(N) and the corresponding modem modem (N) may perform the radio activity for collecting system information from the corresponding wireless network and/or performing measurements in the corresponding wireless network via the free RF signal processing unit RF(2), as long as the RF signal processing unit RF(2) is capable of supporting the RAT of the SIM card SIM(N).

Note that although in the exemplary scenario as shown in FIG. 3-FIG. 6, one modem corresponds to one SIM card, the invention should not be limited thereto. As discussed above, one modem may correspond to one or more SIM cards for processing the baseband signals and processing or handling the communications procedures thereof, so as to assist the corresponding SIM card(s) in communicating with a corresponding peer communications apparatus in the wireless network.

Figure 7:
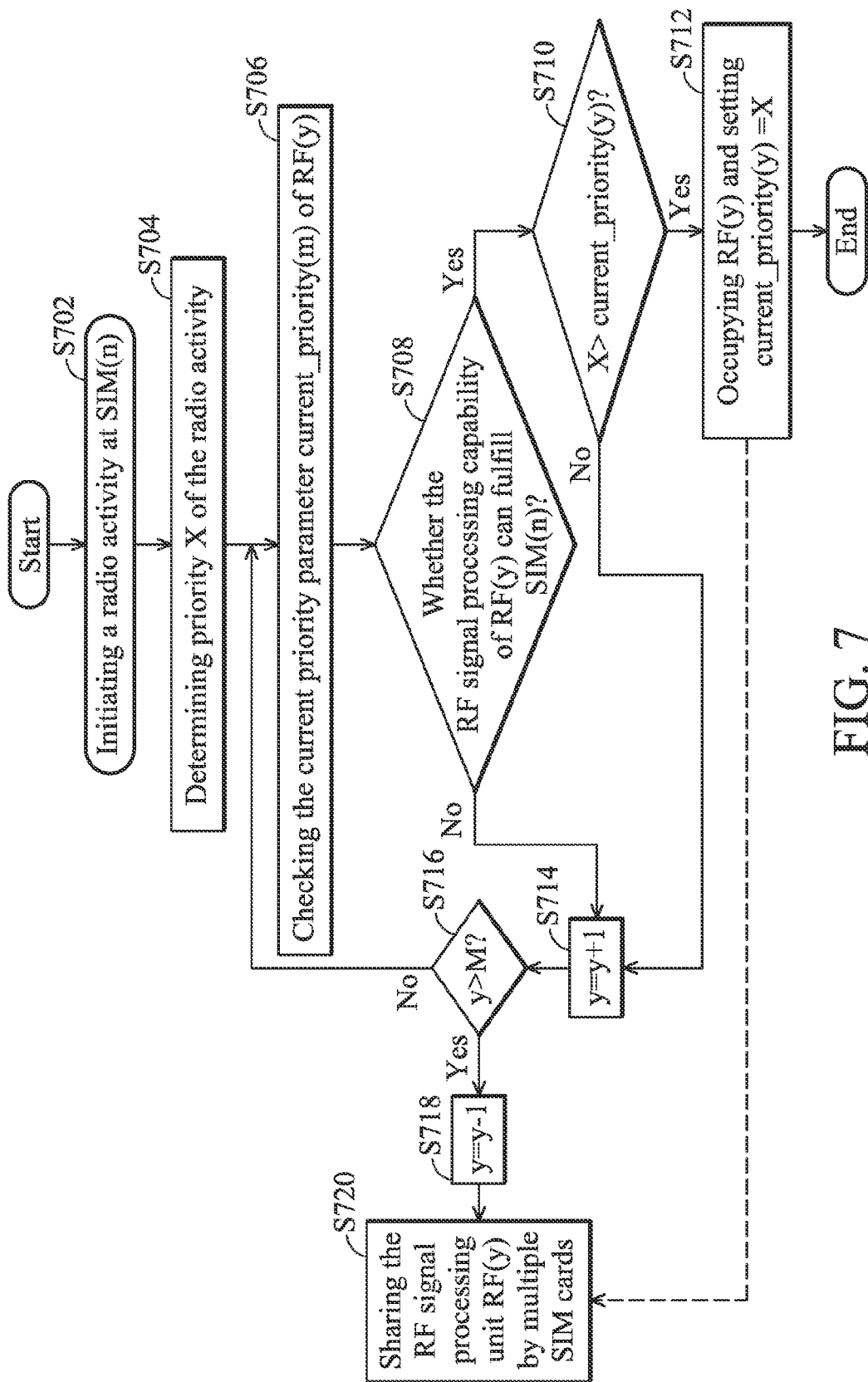
FIG. 7 shows an exemplary flow chart for determining a suitable RF signal processing unit for a SIM card initiating a radio activity according to an embodiment of the invention.

FIG. 7 shows an exemplary flow chart for determining a suitable RF signal processing unit for a SIM card initiating a radio activity according to an embodiment of the invention. In the embodiment, suppose that the RF signal processing capability of the RF signal processing units RF(1)~RF(M) are presorted in ascending order, and RF signal processing capability RF_CAPA(RF(1))≤RF_CAPA (RF(2)) . . . ≤RF_CAPA(RF(M)), where the RF_CAPA(RF (m)) is an RF signal processing capability indicator of the RF signal processing unit RF(m) indicating the RF signal processing capability thereof, and where 1≤m≤M.

Figure 8:
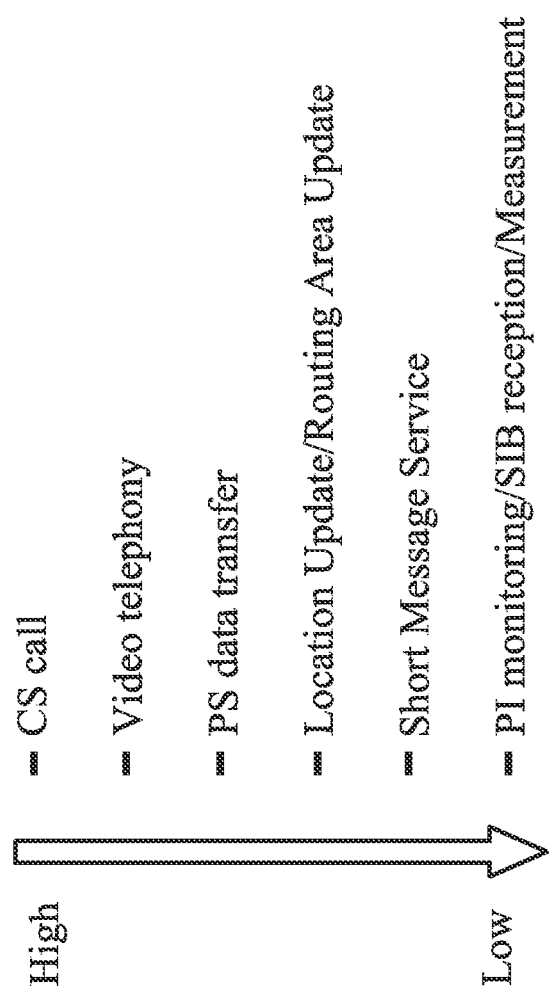
FIG. 8 shows exemplary radio activities with presorted priority levels in a descending order according to an embodiment of the invention.

When a SIM card SIM(n) initiates a radio activity (Step S702), the arbiter may first determine priority X of the radio activity (Step S704). According to an embodiment of the invention, the arbiter may determine priority of the radio activity according to the impact on user experience. For example, the arbiter may give higher priority to a radio activity that can highly affect user experience. According to another embodiment of the invention, the arbiter may determine priority of the radio activity according to whether the radio activity is triggered by user operation. For example, the arbiter may give higher priority to a radio activity that is triggered by the user than another radio activity that is automatically triggered by the communications apparatus 100. According to yet another embodiment of the invention, the arbiter may determine priority of the radio activity according to the extent of mobility impacted by radio activity. For example, the arbiter may give higher priority to a radio activity that impacts the mobility of the communications apparatus more seriously than another radio activity. FIG. 8 shows exemplary radio activities with presorted priority in a descending manner according to an embodiment of the invention.

Next, the arbiter may check the current priority parameter current_priority(y) of the RF signal processing unit RF(y) (Step S706), wherein y is generally started from 1. Here, the parameter current_priority(y) is utilized for recording the priority of the radio activity currently handled by the RF signal processing unit RF(y). When the RF signal processing unit RF(y) is not currently handling any radio activity, the parameter current_priority(y) is set to 0. Next, the arbiter may check whether the RF signal processing capability of the RF signal processing unit RF(y) can fulfill the capability requirement of the SIM card SIM(n) (Step S708). The capability requirement of the SIM card SIM(n) may be selected from the group comprising the RAT, the frequency band and/or the bandwidth supported by SIM(n), or others.

When the RF signal processing capability of the RF signal processing unit RF(y) can fulfill the capability requirement of the SIM card SIM(n), the arbiter may further determine whether the current radio activity of SIM(n) has higher priority, that is, X>current_priority(y) (Step S710). When X>current_priority(y), the RF signal processing unit RF(y) is occupied with the current radio activity of SIM(n) for handing the current radio activity of SIM(n) and the parameter current_priority(y) is set to X (Step S712). After step S712, the arbiter may trigger another flow to further determine another suitable RF signal processing unit for handling the original radio activity (if there was any) which was previously handled by the RF signal processing unit RF(y). For example, the arbiter may then determine another suitable RF signal processing unit that is shared by multiple SIM cards to handle the original radio activity as the dotted line linked to step S720, or may then determine another suitable RF signal processing unit that is able to dedicatedly handle the original radio activity.

When the current radio activity of SIM(n) does not have higher priority, that is, X≤current_priority(y), or when the RF signal processing capability of the RF signal processing unit RF(y) cannot fulfill the capability requirement of the SIM card SIM(n), the arbiter may set y=y+1 for checking a next RF signal processing unit (Step S714). Next, the processor may check whether y>M (Step S716). If not, the flow returns to step S706. If yes, the arbiter may set y=y−1 (Step S718) and the RF signal processing unit RF(y) may be shared by more than one SIM card for handling the radio activities thereof (Step S720).

Based on the concept introduced in FIG. 7, an exemplary scenario is introduced. Suppose that the RF signal processing module 130 comprises a first RF signal processing unit and a second RF signal processing unit, and the SIM cards comprise at least a first SIM card, a second SIM card and a third SIM card. According to an embodiment of the invention, when priority of a first radio activity of the first SIM card is higher than priority of a second radio activity of the second SIM card and priority of a third radio activity of the third SIM card, after going through the flow shown in FIG. 7, the first SIM card may dedicatedly use the first RF signal processing unit for handling the first radio activity, and the second SIM card and the third SIM card may share the second RF signal processing unit for handling the second radio activity and the third radio activity. The second RF signal processing unit may handle the second radio activity and the third radio activity by turn.

Note that in other embodiments, when y>M in step S716, the arbiter may also put the original radio activity (if there was any) which was previously handled by the RF signal processing unit RF(y) in a pending state until an RF signal processing unit is free for handling any radio activity. Therefore, the invention should not be limited to the steps shown in FIG. 7.

Compared to conventional designs, based on the concept of the invention, the problems of MT call completion rate downgrade, PS performance downgrade and mobility downgrade can be solved. To be more specific, in the embodiments of the invention, when at least one of the RF signal processing units is dedicatedly used by one SIM card for handling the radio activity thereof, such as CS call, PS data transfer or others, the paging indicator of the other SIM cards can still be monitored via the other RF signal processing unit(s). Therefore, the MT call completion rate downgrade problem can be solved. In addition, since at least one of the RF signal processing units is shared by more than one SIM card for handling the radio activities thereof by turns, there is no need to provide any gap for performing the radio activities such as measurement or listening to paging during the PS data transfer of a specific SIM card. Therefore, the PS performance downgrade problem can be solved. In addition, since at least one of the RF signal processing units is shared by more than one SIM card for handling the radio activities thereof by turns, such as the location update, routing area update, or others, the mobility downgrade problem during the CS call or PS data transfer of a specific SIM card can be solved.

In addition, since the radio activity a specific SIM card may be handed to and performed by another SIM card instead, the system information and/or measurement results may be obtained as soon as possible during the period when the specific SIM card is unable to collect the system information or perform measurement by itself. In cases where a RAT change or cell reselection procedure is required, the specific SIM card may change to a preferred RAT or cell as soon as possible, and the success rate of RAT change or cell reselection can be increased as well.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above-discussed function. The one or more processors can be implemented in numerous ways, such as with dedicated hardware, or with general purpose hardware that is programmed using microcode or software to perform the functions recited above.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising: a plurality of SIM cards; an RF signal processing circuitry, comprising two or more RF signal processing circuits, wherein each RF signal processing circuit comprises one or more antennas and one or more hardware elements to perform radio frequency conversion; and a controller circuitry, configured for dynamically determining which SIM card to use which RF signal processing circuit for handling a radio activity of the SIM card according to priority of a plurality of radio activities of the SIM cards and RF signal processing capability of the RF signal processing circuits, wherein a number of the SIM cards is equal to or greater than a number of the RF signal processing circuits comprised in the RF signal processing circuitry, wherein the two or more RF signal processing circuits comprise at least a first RF signal processing circuit and a second RF signal processing circuit, the SIM cards comprise at least a first SIM card and a second SIM card, wherein the communications apparatus further comprises: a first modem, configured for processing a plurality of baseband signals and processing a plurality of communications procedures of the first SIM card; and a second modem, configured for processing a plurality of baseband signals and processing a plurality of communications procedures of the second SIM card, wherein the first modem provides information regarding a plurality of network-related parameters of a first wireless network that the first SIM card associates with to the second modem, and wherein the second modem schedules a radio activity for performing measurement in the first wireless network to obtain a measurement result according to the network-related parameters, performs the radio activity via the second RF signal processing circuit to collect the measurement result when the first RF signal processing circuit is dedicatedly used by the first SIM, and further provides the collected the measurement result to the first modem.

2. The communications apparatus as claimed in claim 1, wherein at least one of the RF signal processing circuits is dedicatedly used by one SIM card for handling the radio activity thereof.

3. The communications apparatus as claimed in claim 1, wherein at least one of the RF signal processing circuits is shared by more than one SIM card for handling the radio activities thereof by turns.

4. The communications apparatus as claimed in claim 1, wherein the RF signal processing capability of a RF signal processing circuit is selected from a group comprising a number of Radio Access Technology (RAT) supported by the RF signal processing circuit, a number of frequency bands supported by the RF signal processing circuit, and a bandwidth supported by the RF signal processing circuit.

5. The communications apparatus as claimed in claim 1, wherein the two or more RF signal processing circuits comprised in the RF signal processing circuitry are capable of supporting RF signal processing of more than one RAT.

6. The communications apparatus as claimed in claim 1, wherein, the SIM cards further comprise a third SIM card, and wherein when the priority of a first radio activity of the first SIM card is higher than the priority of a second radio activity of the second SIM card and the priority of a third radio activity of the third SIM card, the controller circuitry determines that the first SIM card is able to dedicatedly use the first RF signal processing circuit for handling the first radio activity.

7. The communications apparatus as claimed in claim 6, wherein the controller circuitry further determines that the second SIM card and the third SIM card are able to use the second RF signal processing circuit for handling the second radio activity and the third radio activity by turns.

8. The communications apparatus as claimed in claim 6, wherein the second modem schedules a fourth radio activity for collecting system information from the first wireless network according to the network-related parameters, performs the fourth radio activity via the second RF signal processing circuit to collect the system information, and further provides the collected system information to the first modem.

9. A method for handling a plurality of radio activities of a plurality of SIM cards equipped in a communications apparatus, wherein the communications apparatus further comprises a RF signal processing circuitry comprising two or more RF signal processing circuits and a number of the SIM cards is equal to or greater than a number of the RF signal processing circuits comprised in the RF signal processing circuitry, the method comprising:
determining RF signal processing capability of the RF signal processing circuits;
determining priority of the radio activities of the SIM cards;
dynamically determining which SIM card to use which RF signal processing circuit for handling the radio activity thereof according to the priority of the radio activities of the SIM cards and the RF signal processing capability of the RF signal processing circuits,
wherein the two or more RF signal processing circuits comprise at least a first RF signal processing circuit and a second RF signal processing circuit, the SIM cards comprise at least a first SIM card and a second SIM card, and the method further comprises:
performing a radio activity for performing measurement in a first wireless network that the first SIM card associates with to obtain a measurement result by the second SIM card and the second RF signal processing circuit when the first RF signal processing circuit is dedicatedly used by the first SIM card for handling the radio activity of the first SIM card.

10. The method as claimed in claim 9, wherein at least one of the RF signal processing circuits is dedicatedly used by one SIM card for handling the radio activity thereof.

11. The method as claimed in claim 9, wherein at least one of the RF signal processing circuits is shared by more than one SIM card for handling the radio activities thereof by turns.

12. The method as claimed in claim 9, wherein the RF signal processing capability of a RF signal processing circuit is selected from a group comprising a number of Radio Access Technology (RAT) supported by the RF signal processing circuit, a number of frequency bands supported by the RF signal processing circuit, and a bandwidth supported by the RF signal processing circuit.

13. The method as claimed in claim 9, wherein the method further comprises:
performing a radio activity for collecting system information from the first wireless network by the second SIM card and the second RF signal processing circuit when the first RF signal processing circuit is dedicatedly used by the first SIM card for handling the radio activity of the first SIM card.

14. The method as claimed in claim 13, further comprising:
providing information regarding a plurality of network-related parameters of the first wireless network from the first SIM card to the second SIM card.

15. The method as claimed in claim 13, further comprising:
providing the collected system information and/or the measurement result from the second SIM card to the first SIM card.

* * * * *